Patented Oct. 30, 1945

2,387,836

UNITED STATES PATENT OFFICE 2,387,836

4-METHYL-ALPHA-METHYL STYRENE FROM BICYCLIC TERPENES

James K. Dixon, Riverside, Conn., assignor to American Cyanamid Company, New York, N. Y., a corporation of Maine No Drawing. Application June 23, 1943,
Serial No. 491,940

3 Claims. (Cl. 260—669)

This invention relates to the dehydrogenation of bicyclic terpenes. More particularly, the invention relates to the direct production of 4-methyl, alpha-methyl styrene by catalytic dehydrogenation in the vapor phase of bicyclic terpenes. The present application comprises a continuation-in-part of my copending application for United States Letters Patent, Serial No. 471.875. filed January 9, 1943, now Patent 2,376,308.

4-methyl, alpha-methyl styrene is commonly referred to simply as dimethyl styrene and is so designated in the present specification. In recent years it has been the subject of increasing industrial interest. Among its many uses, polymerized dimethyl styrene is an excellent plasticizer for polymers of many other vinyl compounds and their derivatives. It copolymerizes readily with such materials as acrylonitrile to produce an excellent molding resin and the copolymers are also valuable in the production of paints and the coating of textiles, paper and the like. Dimethyl styrene polymer, itself, is an excellent high temperature insulating oil.

In my copending application, Serial No. 491,939, filed of even date, I have set forth a process whereby monocyclic terpenes, such as dipentene, terpinolene, or the terpinenes, for example, may be directly converted to dimethyl styrene in a single-stage process, the products being recoverable in a pure state in good yields. In general, this was carried out by vaporizing a monocyclic terpene such as dipentene, preheating the vapors to about 450° C. and passing the vaporized material over a suitable dehydrogenation catalyst at temperatures of from 450–700° C. The products are collected by condensation and separated by fractional distillation.

Until the development work done in connection with that application it was not even recognized that dimethyl styrene was one of the reaction products obtainable by dehydrogenating a monocyclic terpene. However, it was shown therein, that dimethyl styrene can be produced in good yield in a single-step process from dipentene. Since bicyclic terpenes such as alpha- and beta-pinene are isomeric with the monocyclic terpenes it should be theoretically possible to convert bi-cyclic terpenes to dimethyl styrene, probably according to the following reaction:

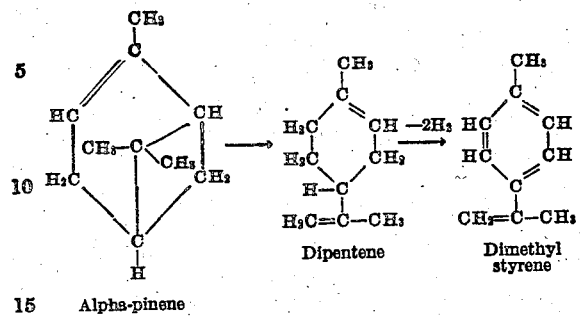

However, like many dehydrogenation processes, such a procedure is simple in theory but difficult in practice. It is not only necessary to break up the bicyclic ring structure but also to form an isopropyl side chain, a group ordinarily subject to excessive cracking. Further, the use of a bicyclic terpene as a raw material obviously introduces the possibility of many more side reactions. As a result the actual reaction probably more nearly resembles the following:

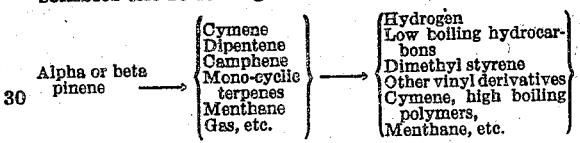

When compared with any of the known art on treating terpenes, this appears to be even more impractical as a potential source of dimethyl styrene than the monocyclic terpene conversion was considered before the disclosure in my copending application. The production of dimethyl styrene would appear from these facts to require at least two operations. First the isomerization of the bicyclic terpenes to a monocyclic terpenes followed by a separatory process to isolate the dipentene and then the operation of the dipentene-dimethyl styrene process of my copending application. Not only would the operation of such a multi-stage process be undesirable because of the duplication of process steps and apparatus, but it would be wasteful of the materials since the opportunities for cracking losses, handling losses and the like are multiplied. Furthermore, some of the monocyclic terpenes tend to polymerize on heating, therefore losses incurred during vaporization of these compounds are increased in any multi-step process.

Nevertheless, because of the availability of bicyclic terpenes as raw materials, a process by which they can be readily converted to commercially-desirable products such as dimethyl styrene is highly desirable. Despite the teachings of the prior art, it is the object of the present invention to develop such a process. Surprisingly enough, I have now found that the conversion of bicyclic terpenes to dimethyl styrene can be carried out in a single-step in the vapor phase by a suitable choice of a catalyst and by properly controlling the contact times and temperatures.

In general, this is accomplished by controlling the contact time between the vaporized terpene and the catalyst mass. In addition, the catalyst is preferably divided into two temperature zones, one for the isomerization and one for the dehydrogenation. The temperature of each is controlled to produce optimum performance of the desired function in each. While not absolutely necessary, it is of advantage to have the vaporized terpene at approximately the catalyst temperature when initially contacted therewith. In this way a single-pass operation is carried out which produces dimethyl styrene in a readily isolatable form and in good yield.

It has long been known that bicyclic terpenes can be converted to their monocyclic isomers by heating them under proper conditions in the presence of a suitable isomerization catalyst. Such catalysts may be used in the first zone of the conversion chamber in carrying out the process of the present invention if so desired.

One such material which has been used for this purpose at about 250–450° C. is clay. However, this necessitates use of two different catalysts in the conversion chamber. This introduces certain operational difficulties in packing and reactivating the catalysts which it is desirable to avoid. Such a procedure has little advantage over a multiple-stage operation.

Isomerization of the bicyclic terpenes appears to require a temperature range about the same as that which is shown in my application, Serial No. 491,939 to be the optimum pre-heat temperature for the best conversion of a monocyclic terpene to dimethyl styrene, i. e., about 250–450° C. As was also shown in that application, increasing the temperature of a mono-cyclic terpene above this range in the presence of the catalyst produces excessive cracking, particularly of the isopropyl side chain. It would be expected that heating a bicyclic terpene in the presence of a catalyst would result in even more cracking since it is in this part of the reaction that the isopropyl side-chain must be formed. Surprisingly enough, it has now been found that heating a bicyclic terpene in this way, in the presence of many dehydrogenation catalysts does not produce this expected cracking.

Even more surprising, I have now found that raising the temperature of a bicyclic terpene in the presence of many of the same catalysts which are most effective in dehydrogenating a monocyclic terpene not only does not induce the expected cracking but actually promotes isomerization. The latter proceeds smoothly in good yields.

In my copending application, Serial No. 491,939, these catalysts are shown to comprise the difficultly-reducible oxides of chromium, molybdenum, uranium and vanadium. Preferably, the oxides are supported on a carrier which is surface-active at dehydrogenation temperatures. Commercial "Activated Alumina" such as that produced by the processes of United States Patent Nos. 1,868,869 and 2,015,593 was found to be particularly well-suited for this purpose.

By taking advantage of this discovery, it is possible to use only a single catalyst in the conversion chamber. Thereby a single-pass process using a single catalyst is established which produces better results more readily than a multi-pass and/or multi-catalyst operation and escapes the operational difficulties noted above. It is therefore necessary only to control the contact times and temperatures within the effective ranges for each in order to produce dimethyl styrene directly from a bicyclic terpene.

It is possible to vary the temperatures of the catalyst zones within quite wide limits without departing from the scope of the present invention. If so desired, the initial zone may be maintained at a uniform temperature of from about 250–450° C. Preferably, however, since the degree of isomerization tends to become poor below 250° C. the lower temperature limit should not be appreciably below this figure. On the other limit, the catalyst temperature should not exceed about 450° C. since at this temperature bicyclic terpenes, such as alpha-pinene, are not entirely stable. Also, above 450° C. there is apt to be a conversion of a part of the isomerized product to aromatic compounds such as toluene and isoprene due to cracking. The appearance of these cracked products at this early point in the conversion apparatus not only cuts down the final yield but impairs the catalyst activity in the subsequent dehydrogenation.

It is not only unnecessary to maintain the initial portion of the catalyst mass at a uniform temperature but it is perhaps preferable not to do so. I have found that a fairly uniform temperature gradient in this zone aids in preventing the cracking of isomerized materials to undesirable side-reaction products. Excellent results may be had by maintaining this initial zone under a temperature gradient rising from about 200–300° C. to about 450° C.

When a temperature gradient is used in the initial part of the catalyst mass, advantage may be also taken of the fact that the catalyst mass need not be maintained at a constant temperature during the conversion of a monocyclic terpene, or a mixture of such terpenes, to dimethyl styrene, as disclosed in my aforementioned copending application. Temperatures required for this conversion are comparatively high, the optimum results apparently being obtained somewhere between 600–700° C. These comparatively high temperatures are difficult to maintain throughout the whole catalyst mass. It is of advantage that the present process permits the operator to maintain the catalyst mass under an increasing temperature gradient from about 250–300° C., at which the terpene vapors enter the isomerization zone, up to a temperature of about 650–700° C. in the zone in which the conversion to dimethyl styrene takes place.

Nor is it necessary that the temperature gradient be particularly uniform. The temperature may be raised in stages if the apparatus being used makes it more convenient to do so. If the apparatus being used permits such a control, excellent results are obtained using one temperature gradient up to about 450° C. in the isomerization zone followed by a sharp rise to a uniform temperature of from about 600–700° C., which is then held in the major portion of the dehydrogenation zone.

Within reasonable limits the contact time between the catalyst mass and the terpene vapors can be quite widely varied without departing from the scope of the present invention. Contact times of from about 2–20 seconds are required for properly effecting the dehydrogenation step. The exact optimum will vary somewhat with the average temperature of the final dehydrogenation portion of the catalyst. Passing the terpene vapors into the conversion chamber at rates which permit sufficient time for dehydrogenation in the final zone ordinarily provides ample time in the initial zone for isomerization to take place. In determining the effective contact times, however, allowance must be made for the increase in volume of the vapors as their temperature rises. Thus the total contact time for both zones will be from about two to one hundred seconds.

The process of the present invention has the advantage that it is not limited to the use of any particular bicyclic terpene. Much of the present discussion has been limited to alpha-pinene since this compound is representative of the class of material which may be treated. However, the process is not intended to be so limited. Other bicyclic terpenes such as beta-pinene, camphene, fenchene and the like may be used.

It is also an advantage of the process of the present invention that it is not necessarily limited to the use of any particular single catalyst. Many of the difficultly reducible metal oxides, i. e. oxides which show little or no tendency to be reduced to the metal itself under the operating conditions of the dehydrogenation zone in which the reaction is carried out, may be used.

Surprisingly, at these temperatures surface-active alumina appears to exhibit catalytic activity. Consequently, a compounded catalyst such as those noted above, comprising a difficultly reducible metal oxide deposited on an Activated Alumina carrier provides a catalyst which gives excellent results. About 2–15% by weight of oxide supported on Activated Alumina forms an excellent example of a suitable catalyst. Oxides of molybdenum and vanadium are also found to be suitable for use in the process of the present invention. Small amounts of the oxides of molybdenum, vanadium and the like amounting to 5 to 10% by weight of the amount of chromium oxide are useful in promoting the activity of the catalyst when chromium oxide-on-alumina is used.

Metallic nickel, copper and the like as well as the easily-reducible metallic oxides were found to be unsuitable since they tended to crack off the isopropyl group and produce toluene or one of its derivatives. Particularly, is this true in the dehydrogenation zone. Clays such as kaolin and the like, in the catalyst supporting bodies should ordinarily be avoided since materials of this type ordinarily promote cracking at the expense of the desirable products.

The process of the present invention is not necessarily limited to the use of any particular apparatus. It is necessary that the material be converted to the vapor state and passed over the catalyst at a rate depending upon the temperature and the volume of the catalytic mass. The reacted vapors may be collected by condensation and separated into their component parts as by fractional distillation. So long as these functions are carried out the exact structure of the apparatus may be varied at will without departing from the scope of the present invention. Nor is the process limited to any particular materials from which the apparatus is to be constructed. Much of the development work was carried out using stainless steel reaction vessels. However, any material which is catalytically inactive, does not contaminate the materials and is resistant to intergranular attack by hydrogen liberated during the reaction may be used.

The present invention will be more fully illustrated in connection with the following examples which are illustrative and not by way of limitation. All parts are by weight unless otherwise noted.

*Example 1*

Alpha-pinene, having a boiling point of 154–156° C. and a refractive index $$N_D^{20}=1.4632$$

was flash vaporized above its boiling point at the rate of 5 cc. of liquid per minute. These vapors were preheated and passed over 2,000 cc. of a 10% chromium oxide ($Cr_2O_3$) on Activated Alumina catalyst. This catalyst was prepared by impregnating Activated Alumina with chromium nitrate, igniting slowly under 300° C. and then reducing with hydrogen at slowly increasing temperatures up to about 500° C. The catalyst temperatures varied approximately uniformly from an inlet temperature of 350° C. to a temperature of about 600–625° C. in the last 50% of the catalyst. After passing over the catalyst the reacted vapors were condensed and separated by fractional distillation. Analysis of the resultant fraction indicated a production of about 25% dimethyl styrene, 10% cymene and small fraction of paramethyl styrene and para-ethyl toluene. Excess gas evolution indicated the presence of side reactions, believed to be of cracking character because of the production of small amounts of benzene, toluene and other low boiling compounds.

*Example 2*

The procedure described in Example 1 was repeated using a pinene feed rate of 20 cc. of liquid per minute. This increase in feed rate was found to be advantageous since it reduced the contact time and thereby decreased the production of side reaction products by cracking. This was found to approximately double the dimethyl styrene and cymene content of the reacted product. A corresponding decrease in both the evolution of gases and the production of low boiling products was obtained.

*Example 3*

Again the procedure of Example 2 was repeated raising the inlet temperature of the catalyst to about 450° C. Under these conditions it was found that the tendency of the initial portion of the catalyst to promote cracking was emphasized since alpha-pinene is not completely stable at this temperature. The dimethyl styrene content of the product appreciably decreased from that of Example 2.

*Example 4*

Again the procedure of Example 2 was repeated using an initial catalyst temperature of about 350° C. but reducing the exit temperature to about 550° C. This was found to decrease the dimethyl styrene content in the product from that of Example 2 by about 25% with a corresponding increase in the para-cymene content.

Example 5

A catalyst comprising about 6% of molybdenum oxide ($Mo_2O_3$) on activated alumina was prepared. About 1,000 cc. of catalyst was used to replace the catalyst in repeating the procedure of Example 2. The top catalyst temperature was about 625° C. A product containing about 20% of dimethyl styrene and 45% of p-cymene was obtained, the remainder being approximately the same as obtained in Example 2.

Example 6

10% potassium vanadate ($KVO_3$) catalyst on diatomaceous earth was prepared, about 1,000 cc. of the catalyst being used according to the procedure of Example 5. A product containing about 20% dimethyl styrene was obtained. The catalyst, however, tended to promote cracking, probably due to the presence of the potassium, so that the total amounts of unchanged pinene, toluene and cymene amounted to only about 40%, the p-cymene content being only 15%.

I claim:

1. A process of producing alpha, 4-dimethyl styrene which comprises vaporizing a bicyclic terpene, passing the vaporized material over a catalyst comprising 2–15% by weight of a difficultly-reducible metal oxide selected from the group consisting of the oxides of chromium, molybdenum, vanadium and mixtures of the same on a surface active alumina support, said catalyst being maintained at a temperature increasing from about 250–300° C. at the initial point of contact between the vaporized terpene and the catalyst to a temperature of about 600–700° C., a sufficient volume of catalyst being maintained at the latter temperature to produce a contact time of about 2–100 seconds between the catalyst body at said temperature and the vapors passing thereover.

2. A process according to claim 1 in which the catalyst comprises 2 to 15% by weight of $Cr_2O_3$ and from 1 to 10% of the weight of $Cr_2O_3$ of an oxide selected from the group consisting of the oxides of molybdenum and vanadium on a surface-active alumina support.

3. A process according to claim 1 in which the catalyst comprises 2 to 15% by weight of $Cr_2O_3$ and from 1 to 10% of the weight of $Cr_2O_3$ of an oxide selected from the group consisting of the oxides of molybdenum and vanadium on an Activated Alumina support.

JAMES K. DIXON.